United States Patent [19]

Luo et al.

[11] Patent Number: 5,831,935

[45] Date of Patent: Nov. 3, 1998

[54] METHOD FOR GEOPHYSICAL PROCESSING AND INTERPRETATION USING SEISMIC TRACE DIFFERENCE FOR ANALYSIS AND DISPLAY

[75] Inventors: Yi Luo, Brea; William G. Higgs, Manhattan Beach, both of Calif.

[73] Assignee: Chevron U.S.A. Inc., San Francisco, Calif.

[21] Appl. No.: 610,954

[22] Filed: Mar. 5, 1996

[51] Int. Cl.$^6$ ..................................... G01V 1/34
[52] U.S. Cl. ................. 367/47; 367/59; 364/421
[58] Field of Search ................. 367/41, 46, 47, 367/59, 73; 364/421

[56] References Cited

U.S. PATENT DOCUMENTS

| | | | |
|---|---|---|---|
| Re. 24,648 | 5/1959 | Meiners | 340/15 |
| 2,888,663 | 5/1959 | Blake et al. | 340/15 |
| 3,899,768 | 8/1975 | Quay et al. | 340/15.5 DS |
| 4,059,820 | 11/1977 | Turfening | 367/59 |
| 4,223,399 | 9/1980 | Hackett | 367/41 |
| 4,635,239 | 1/1987 | Neff | 367/47 |
| 4,661,935 | 4/1987 | Shock et al. | 367/70 |
| 4,779,237 | 10/1988 | Bodine | 367/47 |
| 5,056,066 | 10/1991 | Howard | 367/72 |
| 5,083,297 | 1/1992 | Ostrander | 367/36 |
| 5,124,952 | 6/1992 | Knize et al. | 367/34 |
| 5,226,019 | 7/1993 | Bahorich | 367/74 |
| 5,453,958 | 9/1995 | Neff | 367/70 |

OTHER PUBLICATIONS

Brenneke, "Analysis of fault traps" World Oil, (Dec. 1995) vol. 216, No. 12, pp. 63–71.

PCT International Search Report, PCT/US97/02626, International Filing Date Feb. 19, 1997.

Bahorich et al. "3–D seismic discontinuity for faults and stratigraphic features: The coherence cube", Presented at the 64th Annual International Meeting, Society of Exploration Geophysicists (1995) 93–96.

Bahorich et al. "Stratigraphic and structural interpretation with 3–D coherence", Presented at the 64th Annual International Meeting, Society of Exploration Geophysicists (1995) 97–100.

Ortmann et al. "Successful application of 3–D seismic coherency models to predict stratigraphy, offshore eastern Trinidad", Presented at the 64th Annual International Meeting, Society of Exploration Geophysicists (1995) 101–103.

Haskell et al. "3–D seismic coherency and the imaging of sedimentological features", Presented at the 64th Annual International Meeting, Society of Exploratioin Geophysicists (1995) 1532–1534.

Nissen et al. "3–D seismic coherency techniques applied to the identification and delineation of slump features", Presented at the 64th Annual International Meeting, Society of Exploration Geophysicists (1995) 1535–1536.

Taylor "Seeing Inspires Believing 'Coherence Cube' Seeks a Fuller View of Seismic", Explorer (Sep. 1995) 1 and 18–21.

Bahorich et al. "3–D seismic discontinuity for faults and stratigraphic features: The coherence cube", The Leading Edge (Oct. 1995) 14:1053–1058.

Luo et al, 66th Annu. SEG Mtg. Nov. 10, 1996, pp. 324–327; abstract only herewith.

*Primary Examiner*—Nelson Moskowitz
*Attorney, Agent, or Firm*—Burns, Doane, Swecker & Mathis, L.L.P.

[57] ABSTRACT

A method for identifying faults and stratigraphic features within seismic data without interpreter bias by processing seismic data to identify the minimum difference between seismic traces. Large values of difference are plotted as display attributes for seismic reflection data interpretation for two-dimensional and three-dimensional seismic data. The large values of difference represent faults and stratigraphic features within the seismic data. Dip azimuth and dip magnitude attributes can be generated and displayed as well.

23 Claims, 10 Drawing Sheets

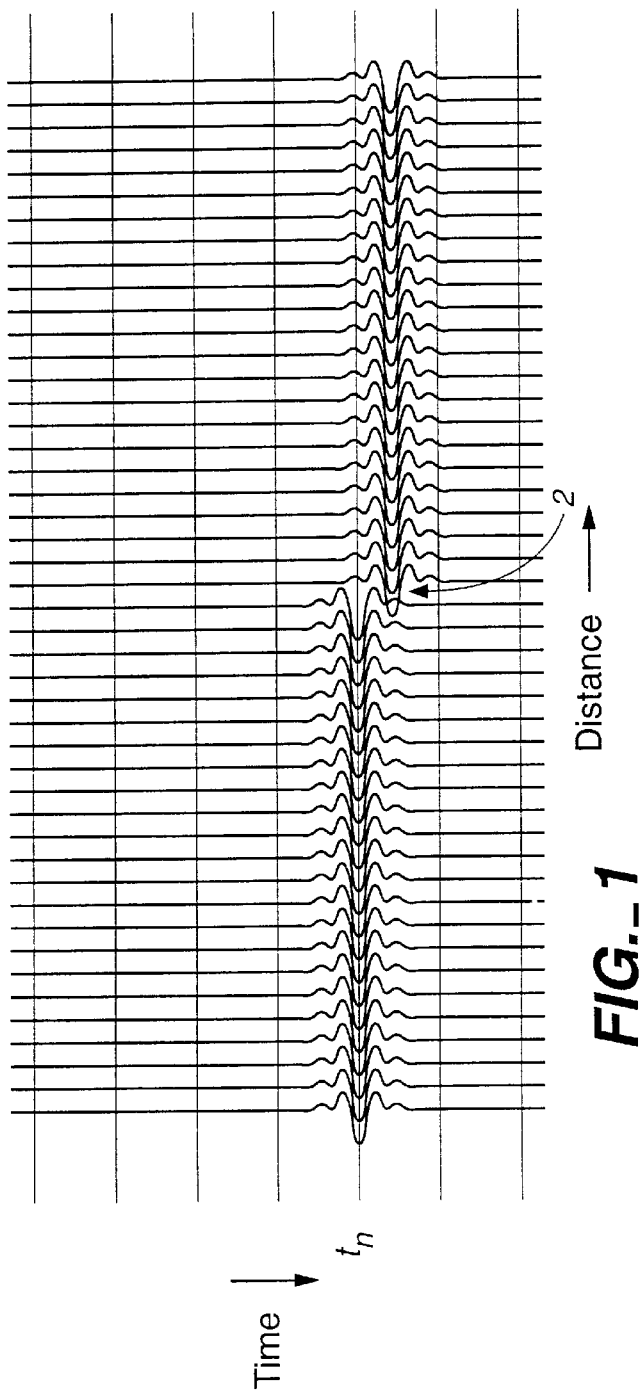
FIG._1
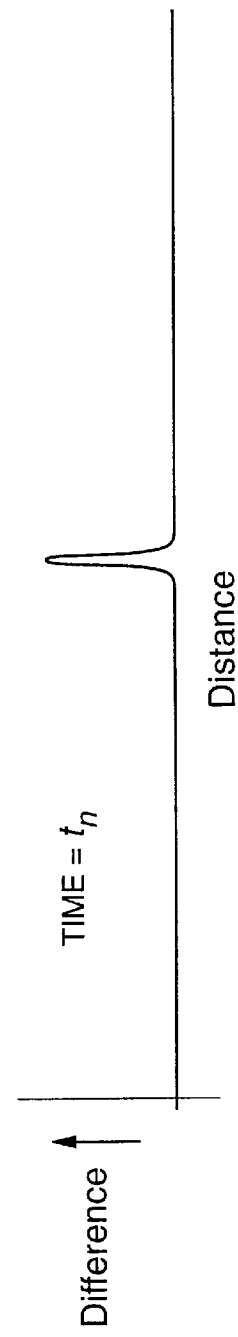
FIG._2

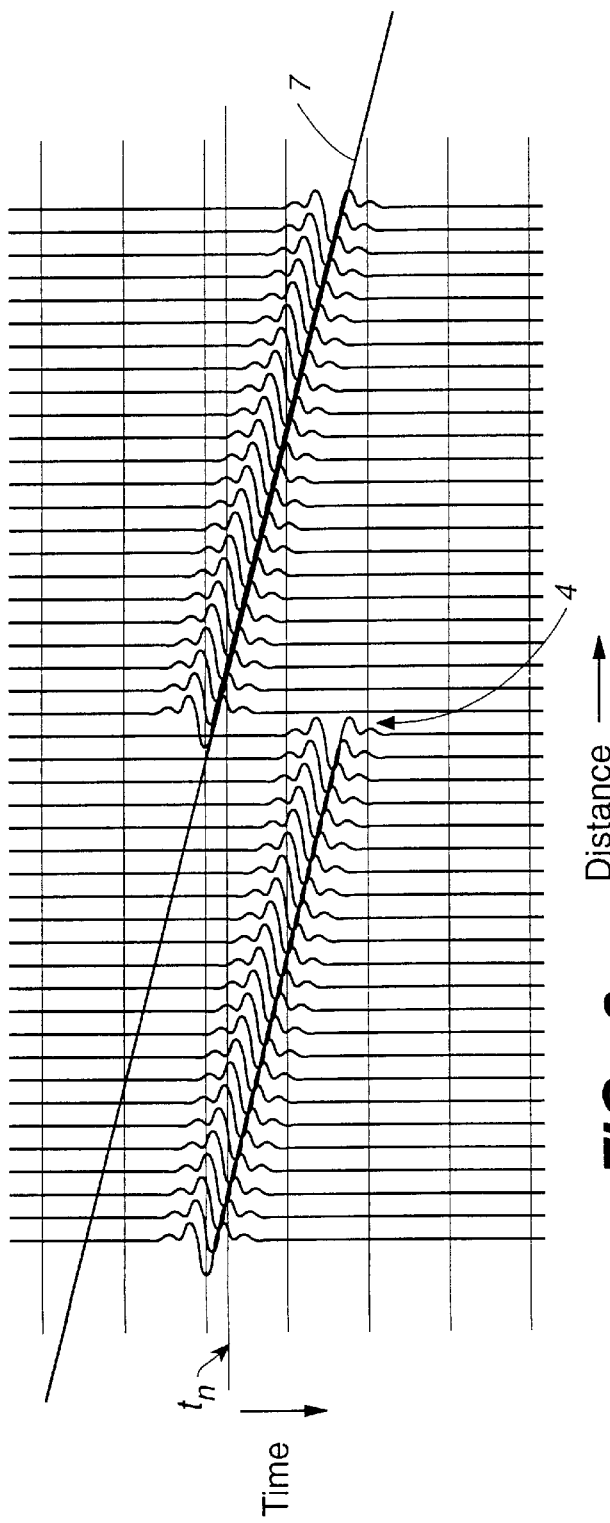
FIG._3
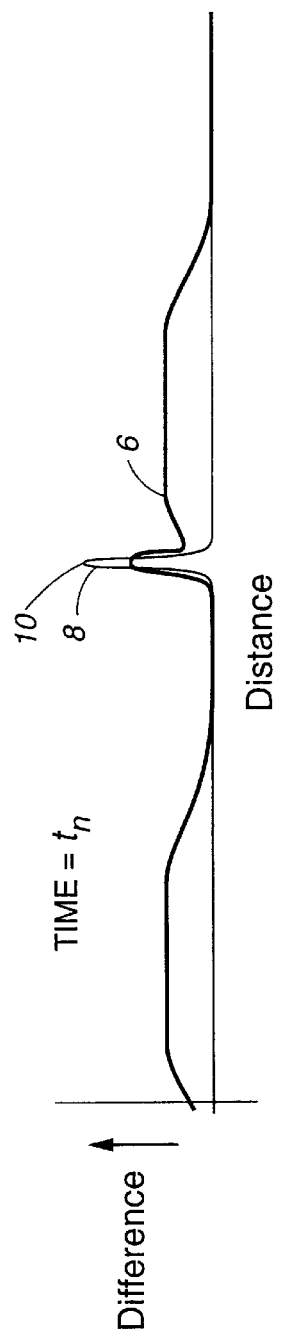
FIG._4

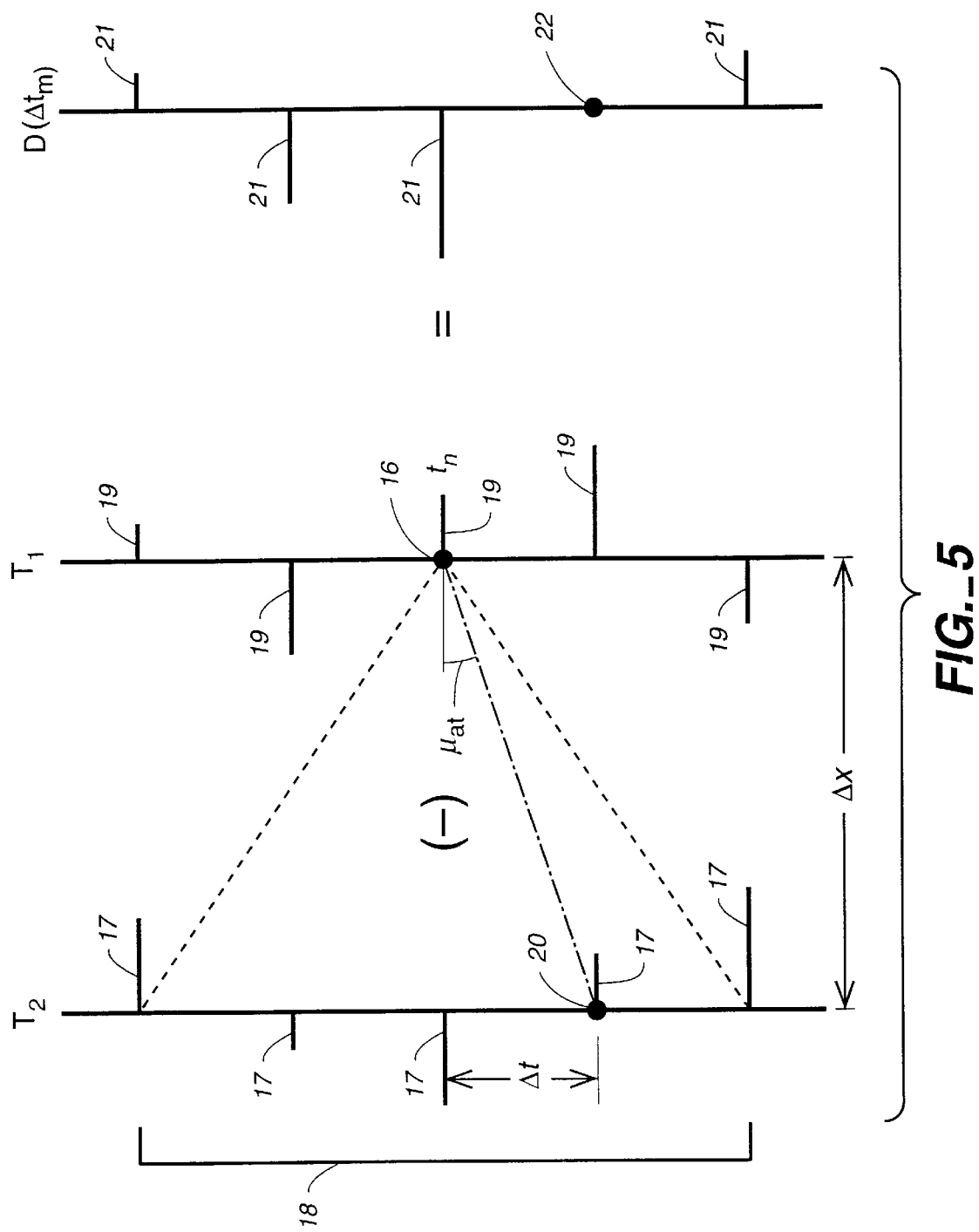

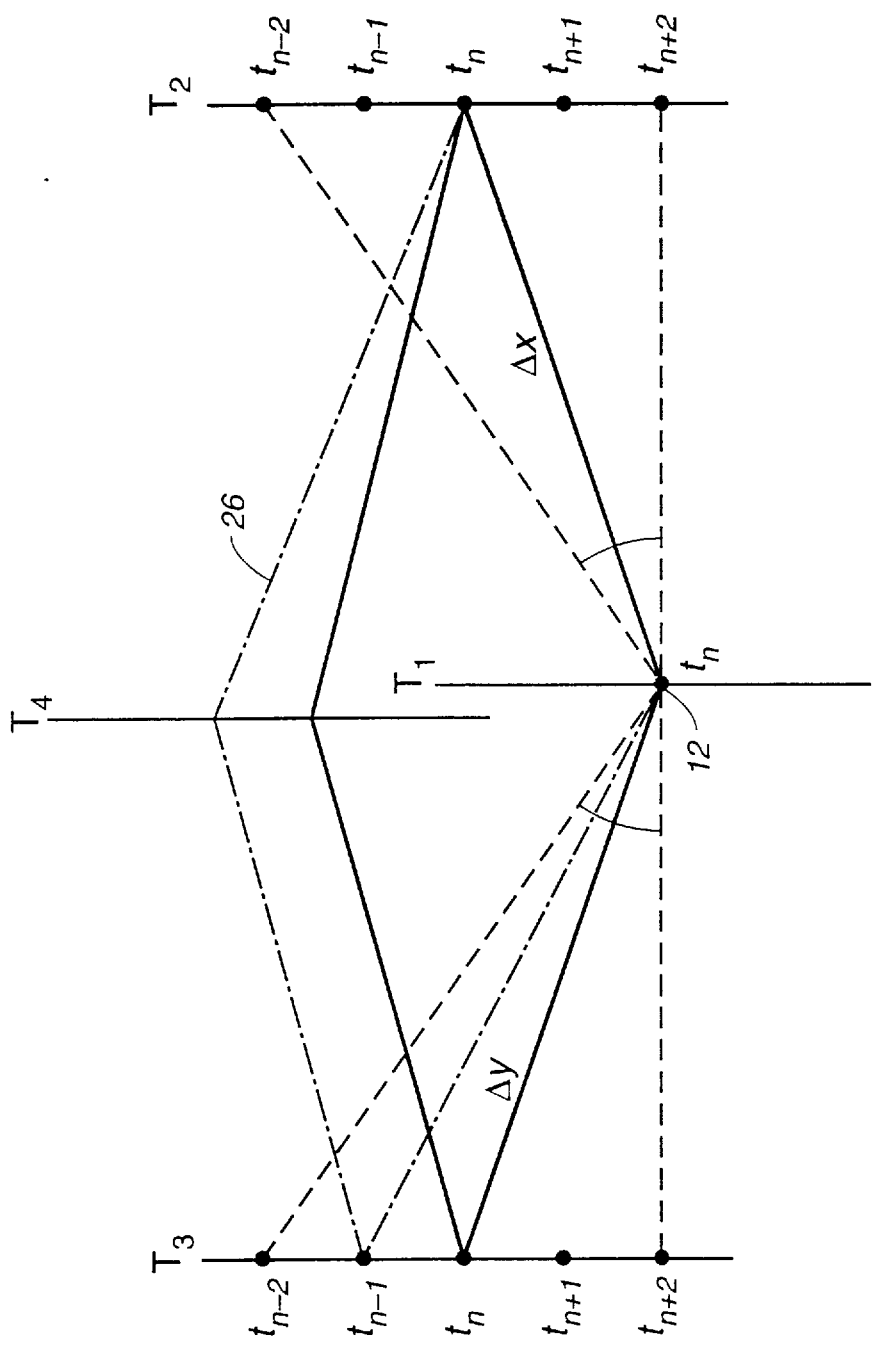
FIG._6

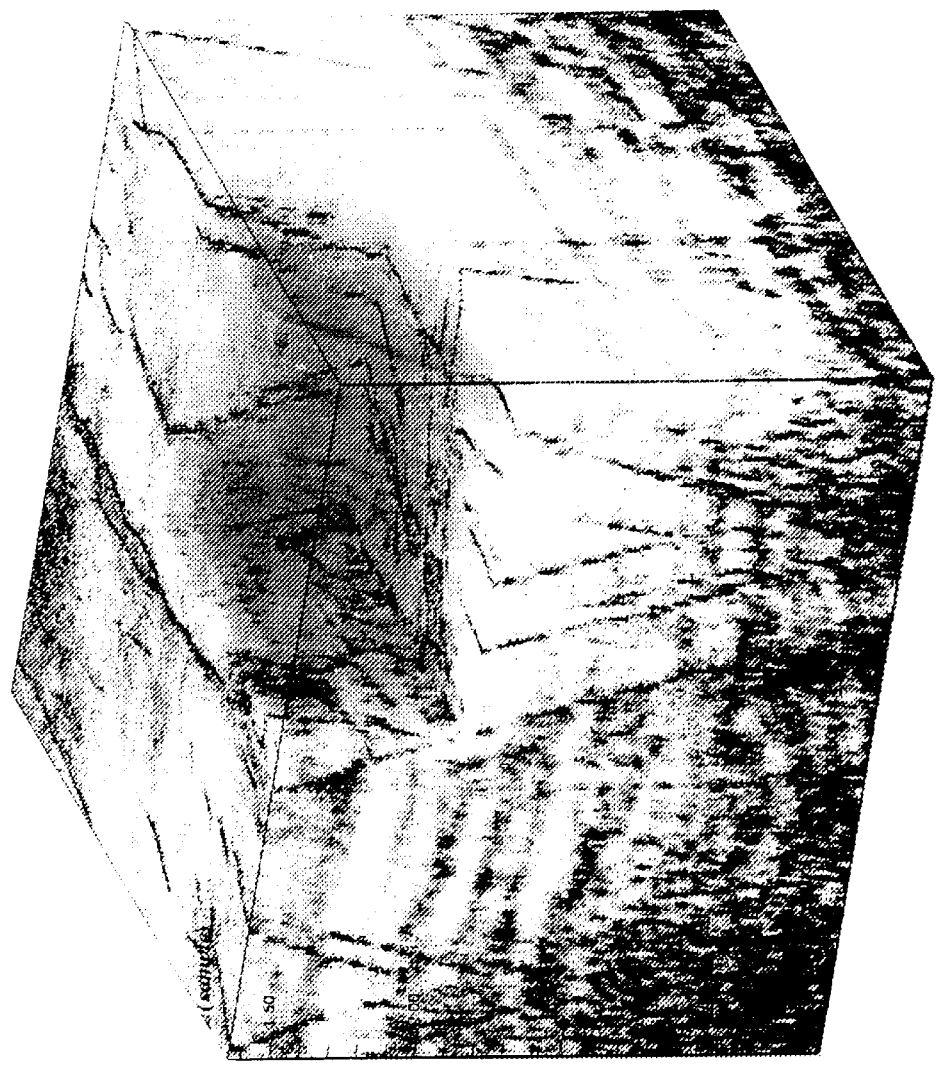
FIG._7

FIG._8

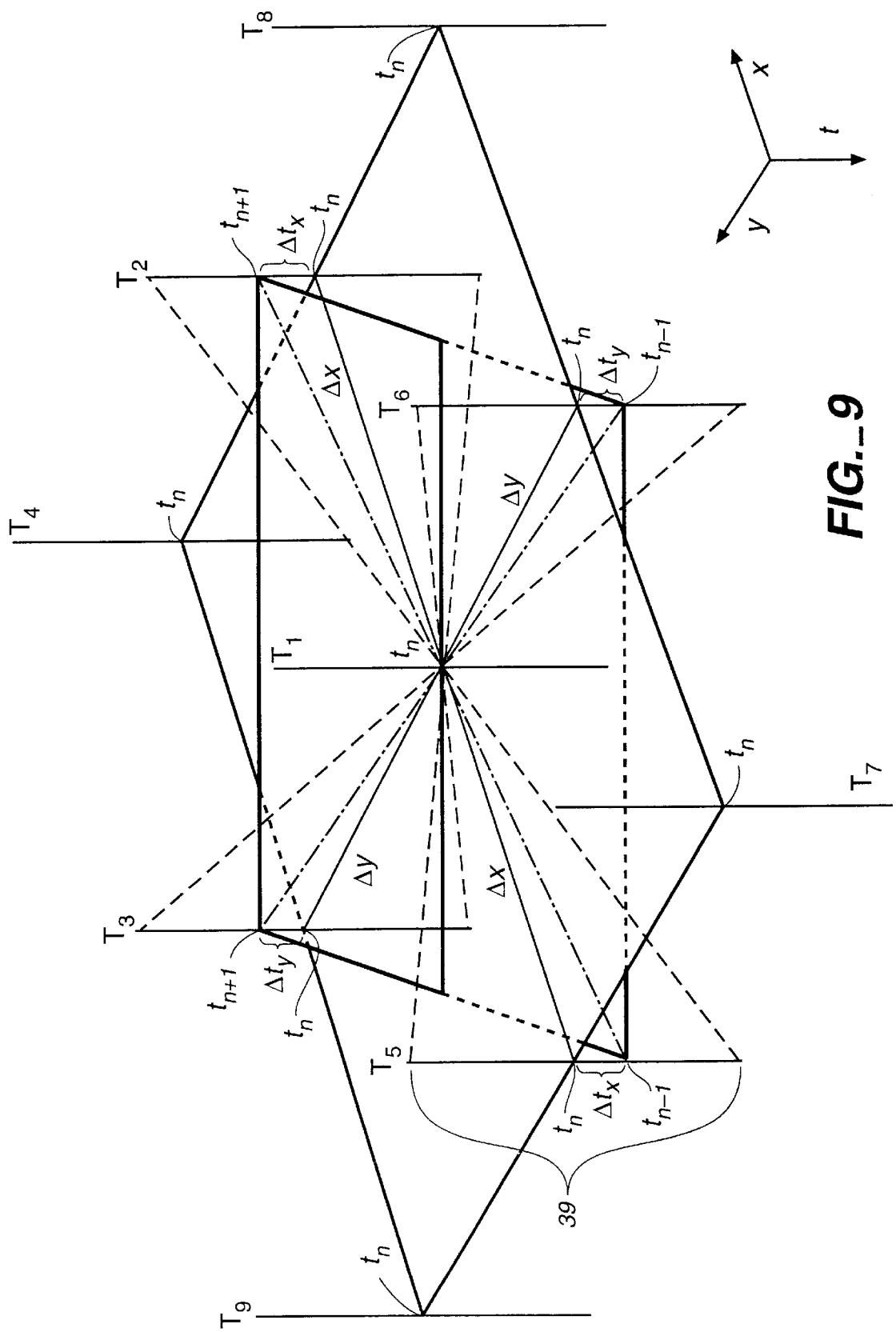
FIG._9

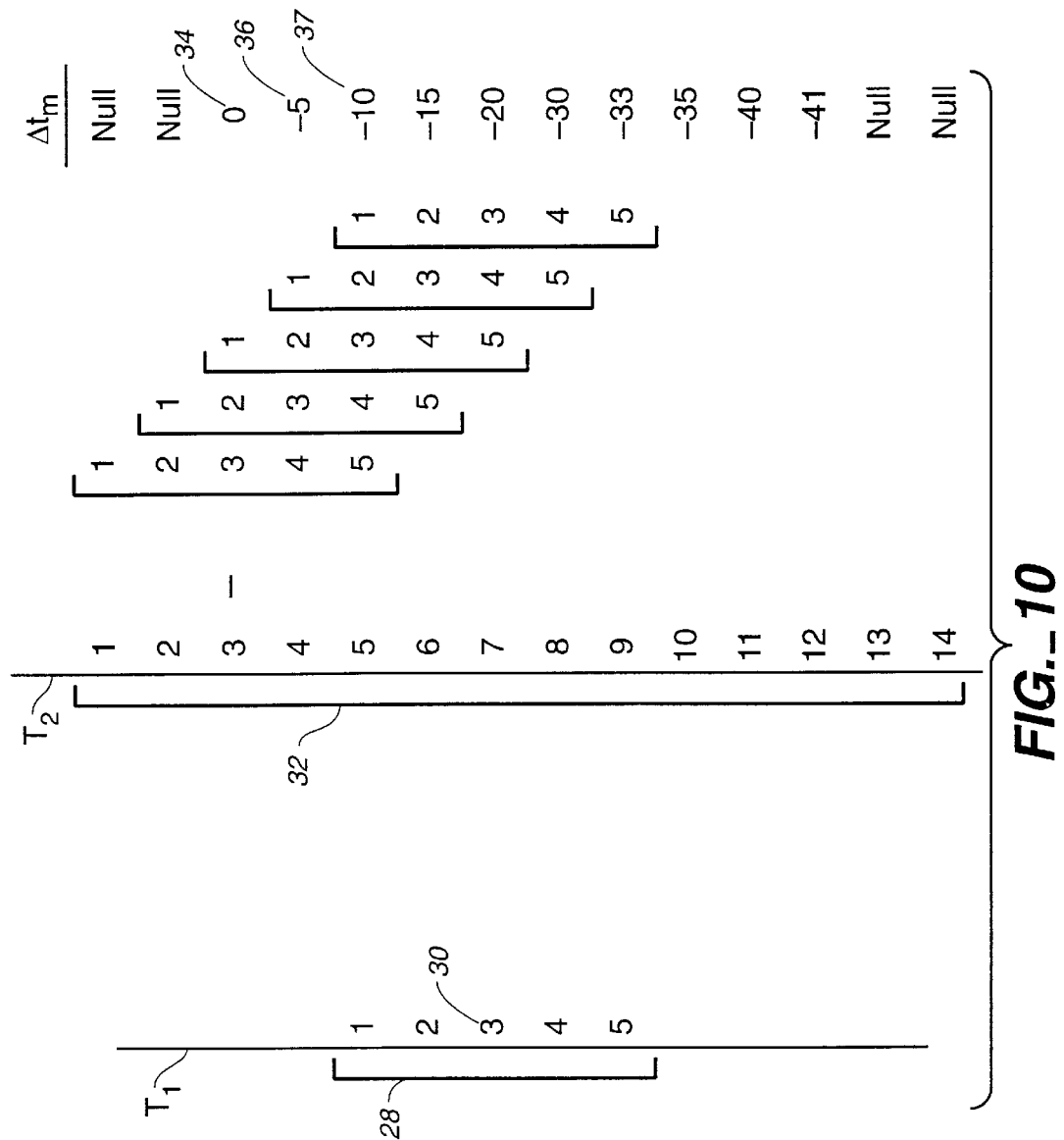
FIG._10

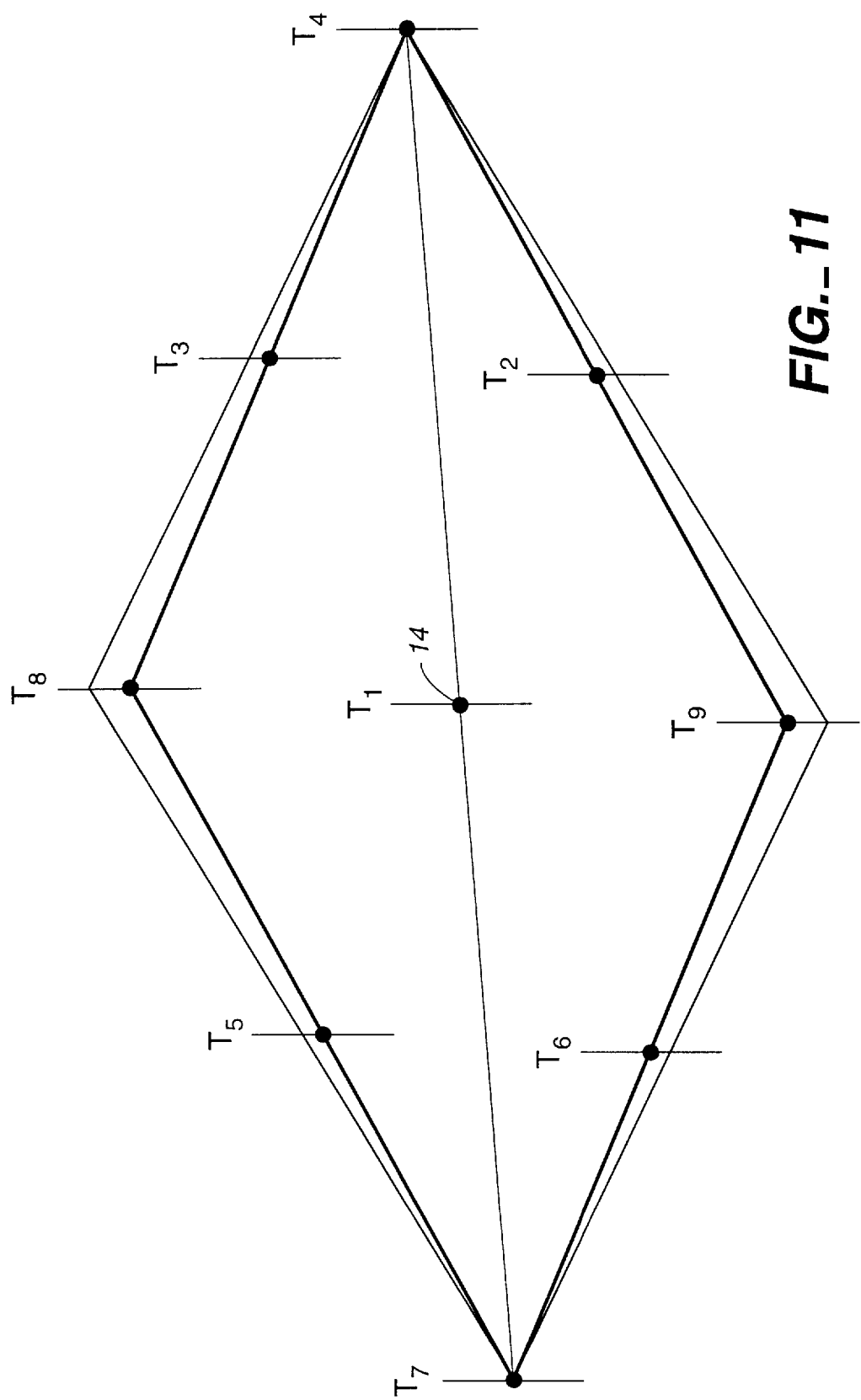
FIG._11

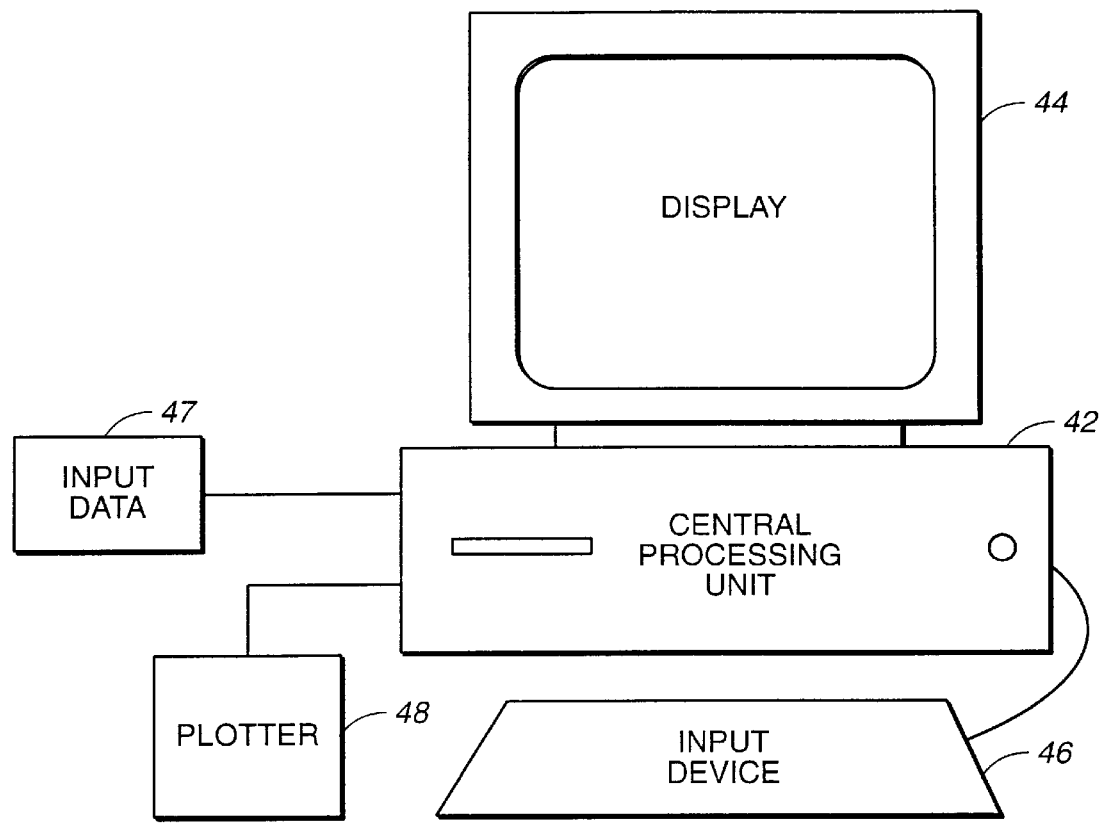
FIG._12

METHOD FOR GEOPHYSICAL PROCESSING AND INTERPRETATION USING SEISMIC TRACE DIFFERENCE FOR ANALYSIS AND DISPLAY

FIELD OF THE INVENTION

The present invention relates generally to an improved method of geophysical exploration and more specifically to an improved method of geophysical data processing and analysis for interpretation of faults and stratigraphic features in both two- and three-dimensional seismic reflection data. The present invention identifies faults and stratigraphic features within the seismic data early in the interpretation process with a new seismic attribute (the difference attribute) and without interpreter bias influencing the location and extent of faults and stratigraphic features thus improving the accuracy of locating hydrocarbon reservoirs for more efficient placement of wells for hydrocarbon recovery.

BACKGROUND OF THE INVENTION

In the continuing search for hydrocarbons in the earth, geophysicists seek methods for evaluating and interpreting the structure of the earth's subsurface formations as well as the effects of stratigraphy, lithology, and pore fluid content on geophysical data in order to relate such effects to the occurrence or presence of hydrocarbons. Determining the occurrence or presence of hydrocarbons influences the placement of wells for recovering the hydrocarbons. Seismic reflection data are traditionally acquired and processed for the purpose of imaging acoustic boundaries, seismic reflection events, in the subsurface. By way of example, exploration geophysicists have developed numerous techniques for imparting seismic wave energy into the earth's subsurface formations, recording the returning reflected seismic wave energy and processing the recorded seismic wave energy to produce seismic signals or traces. Such seismic signals or traces contain a multiplicity of information for example frequency, amplitude, phase, etc., which can be related to geology, lithology or pore fluid content of the earth's subsurface formations. Such features of the seismic signals are generally referred to as instantaneous attributes. Additionally, interpretative techniques generally referred to as stratigraphic interpretative analysis have been developed for analyzing seismic data and for identifying and characterizing changes in lithology, geology and pore fluid content of the earth's subsurface formations from recurring patterns of instantaneous attributes associated with reflection events in seismic data. Exemplary of such focus are Quay et al. in U.S. Pat. No. 3,899,768 and Bodine in U.S. Pat. No. 4,779,237.

The seismic attribute most commonly displayed during the interpretation of both two-dimensional and three-dimensional seismic data is amplitude. This has come about for good reasons as amplitude distinguishes many of the more subtle features of the subsurface that interpreters wish to identify. For example, amplitude 'bright spots' are commonly used as direct hydrocarbon indicators and the correlation of reflections is often defined by a characteristic amplitude response. However, amplitude is only an indirect indicator of fault breaks and dip direction as fault breaks cannot be confidently identified in the time slice domain, therefore amplitude is not as useful in distinguishing fault breaks and dip direction.

Two-dimensional and three-dimensional seismic data are used for interpretation but the use of three-dimensional seismic data continues to grow. Three-dimensional seismic data provides a more detailed structural and stratigraphic image of sub-surface reservoirs than can be obtained from two-dimensional data. The results have been increased hydrocarbon reserve estimates, cost savings from more accurate positioning of delineation and development wells, improved reservoir characterization leading to better simulation models, and the ability to more accurately predict future opportunities and problems during the subsequent production of a field. As an exploration tool, three-dimensional seismic data reduces drilling risks in structurally complex areas and lends itself to reservoir quality prediction in undrilled areas.

The principal advantage of three-dimensional over two-dimensional seismic data is that three-dimensional provides the interpreter with the ability to view seismic data in horizontal "map" form rather than being limited to vertical cross-section views. Using traditional two-dimensional methods of viewing vertical profiles, it is often difficult to get a clear and unbiased view of faults and stratigraphic features hidden in three-dimensional data. Although faults are often readily seen on individual vertical seismic cross-sections, multiple vertical cross-sections must be examined to determine the lateral extent of faulting. Stratigraphic changes are difficult to detect on vertical seismic lines because of the limited profile that they present. To avoid these issues, geoscientists have traditionally utilized two kinds of seismic map displays: amplitude time-slice and seismic horizon-slices. The amplitude time-slice is a horizontal plane, at a constant time, through the three-dimensional volume which displays the amplitude of the seismic data at that time without reference to a stratigraphic horizon. An advantage of the amplitude time-slice is that an interpreter can view geologic features in map form without having to first pick seismic events in the data. The amplitude time-slice is quite under-utilized because the amplitude time-slices can be difficult to interpret, even for experienced geoscientists. The main reason for the poor utilization of this information is that the use of amplitude as the display attribute compromises the resolution of the data to the extent that features cannot be precisely positioned.

The interpretation of features on time slices is currently restricted by the use of seismic amplitude as the display attribute. The problem with amplitude in the time slice dimension is that it is impossible to distinguish the direction of dip from a single time slice. In order to distinguish dip, an interpreter must currently view an inline or crossline, or scroll through a number of time slices to see in which direction the events move. For large structures this is not too restricting, however, for more detailed structural interpretation it is frustrating and tedious.

Even when amplitude is used as the display attribute, the time slice domain does yield a degree of structural information and spatial correlations over large areas, however, dip direction and fault breaks cannot be identified with any certainty. In particular, it is the uncertainty of correctly locating faults on time slices that has developed the 'look at but don't interpret' philosophy of seismic interpreters towards time slices. Both of the problems of dip and fault identification are caused by one of the properties of amplitude, which is for any cycle on a single trace there are always two equal amplitude values. Dual amplitude values make it impossible to distinguish the direction of dip because the amplitude values yield two possible solutions to the dip direction (i.e., either up dip or down dip) which results in an error in the direction of dip of 180 degrees as the two possible solutions are opposite. Secondly, the dual amplitude values diminish the resolution of the data for the identification of faults.

Time-slices are more suitable than vertical profiles for detecting and following the lateral extent of faults and stratigraphic boundaries. However, interpretation is often complicated by the fact that time-slices can cut through different stratigraphic horizons. This problem can be avoided through the use of the horizon-slice, which is the set of seismic amplitudes associated with an interpreted horizon surface, generally at some consistent stratigraphic level. The fact that the horizon surface is at a consistent stratigraphic level means that the attribute extracted from the seismic data to be displayed can highlight subtle lateral changes in the stratigraphy, lithology and fluid content at that one stratigraphic level. The resulting attributes have proved useful for detecting subtle faults associated with the one horizon. The use of previously interpreted surfaces for subtle edge detection is the current state-of-the-art.

In spite of the fact that horizon-slices and associated attribute maps are more useful than amplitude time slices for following faults and stratigraphic features, they too have disadvantages. The geoscientist must "pick" a stratigraphic surface prior to generating the amplitude display, which can be difficult and time-consuming. This also imposes an interpretive bias on the data set and requires that the interpreter has already defined the fault framework that intersects with the horizon under consideration. The edge detection routines are, therefore, only used to identify subtle faults that were not previously interpreted and to highlight the interpreted faults. The other disadvantage of horizon slices is that the results can only be obtained on isolated surfaces in the three-dimensional volume and not on the whole volume.

Other attributes of seismic reflections besides amplitude may be calculated and displayed in a map view as well, including frequency and instantaneous phase. These attributes, however, do not currently form part of the traditional three-dimensional seismic interpretation process and are used more as quality control checks of the processing and migration of the three-dimensional seismic data, or for enhancing event continuity in areas of noisy data on vertical profiles.

SUMMARY OF THE INVENTION

In accordance with the present invention, a new technique has been discovered which utilizes the differences between seismic traces as the display attribute for analysis and interpretation of two-dimensional or three-dimensional seismic data, thus creating a new seismic attribute (i.e., the difference attribute). Time slice interpretation and the three-dimensional seismic interpretation process are improved significantly by the use of seismic trace difference in the present invention to generate display attributes that emphasize faults, stratigraphic boundaries and lithological changes.

The method of using the differences between seismic traces (i.e., the difference method) in the present invention enables the dip magnitude and azimuth of seismic events to be determined resulting in a rapid evaluation of large volumes of three-dimensional seismic data. The difference method of the present invention is also applicable to two-dimensional seismic data. In addition, the invention can be applied to evaluating two seismic datasets of different vintages (i.e., taken at two separate periods in time such as years apart) acquired over the same area to look for changes in fluid properties of the hydrocarbon reservoirs (sometimes referred to as four-dimensional seismic evaluation). The present invention also provides the capability of performing edge detection operations to locate fault breaks and seismic stratigraphic features early in the interpretation process without an interpreter's bias because there is no need for the interpreter to first "pick" a stratigraphic surface.

In accordance with one aspect of the present invention, there is provided a method of processing data of seismic traces for geophysical interpretation of the earth's subsurface, comprising the steps of subtracting a first sample on a first trace from a first sample of a first operator length on a second trace to produce a first difference value, the first operator length being centered about a first operator length sample corresponding to the first sample of the first trace, subtracting the first sample from a second sample of the first operator length to produce a second difference value, designating the minimum of the first difference value and the second difference value as a first minimum difference value for the first difference trace, and posting the first minimum difference value as the first sample in the first difference trace to identify changes within the earth's subsurface.

In accordance with another aspect of the present invention, there is provided a method of processing data of seismic traces for geophysical interpretation of the earth's subsurface, comprising the steps of subtracting a first sample on a first trace from a first sample of a first operator length on a second trace to produce a first difference value, the first operator length being centered about a first operator length sample corresponding to the first sample of the first trace, subtracting the first sample from a second sample of the first operator length to produce a second difference value, designating the minimum of the first difference value and the second difference value as a first minimum difference value for the first difference trace, subtracting the first sample on the first trace from a first sample of a first operator length on a third trace to produce a third difference value, the first operator length being centered about a first operator length sample corresponding to the first sample of the first trace, the third trace is in a first plane containing the first trace, the first plane being orthogonal to a second plane containing the first trace and the second trace, subtracting the first sample from a second sample of the first operator length to produce a fourth difference value, designating the minimum of the third difference value and the fourth difference value as a first minimum difference value for the second difference trace, producing a selected difference value from the first minimum difference value of the first difference trace and the first minimum difference value of the second difference trace and posting the selected difference value to identify changes within the earth's subsurface.

In accordance with yet another aspect of the present invention, there is provided a method of processing data of seismic traces for geophysical interpretation of the earth's subsurface, comprising the steps of subtracting a first sample of a first trace from a first sample of a second trace resulting in a first difference value of a first difference trace and posting the first difference value to identify changes within the earth's subsurface.

In accordance with another aspect of the present invention, there is provided a method of processing data of seismic traces for geophysical interpretation of the earth's subsurface, comprising the steps of subtracting a first window on a first trace centered about a first sample from a first portion of a first operator length on a second trace and combining the resulting values to produce a first difference value, the first operator length being centered about a first operator length sample corresponding to the first sample of the first window, subtracting the first window from a second portion of the first operator length and combining the resulting values to produce a second difference value, designating the minimum of the first difference value and the second difference value as a first minimum difference value for the first difference trace and posting the first minimum difference value as the first sample in the first difference trace.

In accordance with yet another aspect of the present invention, there is provided a method of processing data of seismic traces for geophysical interpretation of the earth's subsurface, comprising the steps of subtracting a first window on a first trace centered about a first sample from a first portion of a first operator length on a second trace and combining the resulting values to produce a first difference value, the first operator length being centered about a first operator length sample corresponding to the first sample of the first window, subtracting the first window from a second portion of the first operator length and combining the resulting values to produce a second difference value, designating the minimum of the first difference value and the second difference value as a first minimum difference value for the first difference trace, subtracting the first window on the first trace from a first portion of a first operator length on a third trace and combining the resulting values to produce a third difference value, the first operator length on the third trace being centered about a first operator length sample corresponding to the first sample of the first window, the third trace is in a first plane containing the first trace, the first plane being orthogonal to a second plane containing the first trace and the second trace, subtracting the first window from a second portion of the first operator length of the third trace and combining the resulting values to produce a fourth difference value, designating the minimum of the third difference value and the fourth difference value as a first minimum difference value for a second difference trace, producing a selected difference value from the first minimum difference value of the first difference trace and the first minimum difference value of the second difference trace and posting the selected difference value to identify changes within the earth's subsurface.

BRIEF DESCRIPTION OF THE DRAWING

The invention will now be described with reference to the accompanying drawing, in which:

FIG. 1 is a portion of hypothetical seismic traces indicating a single, seismic event;

FIG. 2 is a graph of the difference values corresponding to the seismic event of FIG. 1;

FIG. 3 is a portion of hypothetical seismic traces indicating a single dipping seismic event;

FIG. 4 is a graph of the difference values corresponding to the seismic event of FIG. 3;

FIG. 5 is a diagrammatic representation of the production of a difference trace in accordance with one embodiment of the present invention;

FIG. 6 is an isometric view of a portion of a hypothetical three-dimensional seismic data volume;

FIG. 7 is a three-dimensional difference volume plot generated using one embodiment of the present invention;

FIG. 8 is a plot of a map view of a time slice cut through the difference volume of FIG. 7;

FIG. 9 is a 3 by 3 array of hypothetical seismic traces;

FIG. 10 is a diagrammatic representation of the production of the difference values that produce a difference trace in accordance with one embodiment of the invention;

FIG. 11 is a diagrammatic representation of the production of a dipping plane passing through the minimum values on difference traces in a nine trace array; and FIG. 12 is a diagrammatic representation of a conventional computer system useful with the present invention.

DETAILED DESCRIPTION OF THE PREFERRED EMBODIMENTS

Prior to our discussing this invention in detail, the following terms will first be defined.

Definitions

Geophysical interpretation includes the use of reflection and refraction seismic, magnetic, and gravity methods for the analysis of the subsurface. These techniques can be applied to the exploration of oil and gas, minerals, and ground water evaluation.

Seismic Event is the reflection of the seismic wave energy that has been sent into the subsurface which results from a change in the rock properties of the subsurface, or a combination of such changes. This reflected seismic wave energy is recorded at a number of shotpoints, which results in a similar feature on a number of adjacent seismic traces. The similar feature(s), therefore, result in a continuous event in the seismic data.

Picked Surface is a seismic event of interest to the interpreter, which the interpreter has hand correlated or used autopicking routines to correlate. The seismic event is assigned a specific suite of attributes (e.g. name, color, etc.), which are then attached to specific traces in the data volume. The resulting surface represents the geometry of the specific seismic event in the subsurface.

Dip Magnitude is the angle of maximum dip, measured from the horizontal, at a specific point on a picked surface or seismic event. The dip magnitude can change at different locations on the surface, but is defined as the maximum value at each of those locations.

Dip Azimuth is the direction of maximum dip of a picked surface or seismic event (i.e., the compass orientation) in the direction of the dip magnitude. In the following description the dip azimuth will always refer to the direction of dip with respect to true north.

Apparent Dip Magnitude is the angle of dip, measured from the horizontal, at a specific point on a picked surface or seismic event relative to a particular predefined orientation (e.g., two-dimensional seismic section). The apparent dip magnitude need not be, and rarely is, the maximum or true dip magnitude. In fact, the apparent dip magnitude is always less than or equal to the true dip magnitude. The orientation of the apparent dip is defined by the sign (positive or negative) of the angle, which means a dip either to the left or right depending on the convention used.

Edge Detection is defined as the search for boundaries within a seismic data volume that represent faults, stratigraphic discontinuities, changes in lithology, changes in rock properties, changes in fluid content of the formations, and/or changes in the geometry or structural form of subsurface formations.

A time or depth value as used in this application refers to a value that is expressible in either time (i.e., two-way travel time for a reflected seismic wave) or depth. It should be understood that units of time or depth can both be used with equivalent effect in this invention, although they will yield different end values from the calculations.

Difference Attribute Calculation

The present invention is applicable to both migrated and stacked three-dimensional seismic data as well as two-dimensional seismic data. Each of the seismic traces can be obtained by conventional surface seismic equipment such as seismic sources and receivers (e.g., hydrophones and geophones). Conventionally, seismic traces are from either a single set of three-dimensional seismic traces or from several sets or lines of two-dimensional seismic traces. As is well known to those of ordinary skill in the art, a seismic trace corresponding to a particular location on a subterranean surface is typically a composite trace resulting from stacking of numerous traces corresponding to that location and produced by the detection of seismic waves by receivers having that location as their common depth point.

With the present invention, calculating the difference between traces in a seismic data set (i.e., the difference method) and displaying/plotting difference values as the display/plot attribute greatly improves the understanding of the structure of subsurface area being interpreted by providing accurate dip and strike information of seismic events, and edge detection capabilities for the identification of faults and stratigraphic boundaries early in the interpretation process. The difference method of the present invention, therefore, provides a direct measure of the location of faults, anomalous stratigraphic boundaries, and contrasts in rock and fluid properties within a seismic dataset. This information can be used to rapidly build up the structural framework as an integral part of the subsurface interpretation.

In one embodiment, the difference method is the subtraction of values for two traces in a seismic dataset. Samples at a constant time (i.e., depth) on two adjacent traces, or samples on two traces at the same location from different vintages of data, are subtracted resulting in the generation of a difference trace. This is repeated until difference traces are generated for the whole two-dimensional seismic profile or three-dimensional volume using the following equation:

$$D_t = A_t - B_t \quad (1)$$

where D is the difference and A and B are values from different seismic traces at a constant time t (or depth). In the alternative, A and B are values from seismic traces at the same location but gathered at two separate times (i.e., two different vintages). FIG. 1 illustrates, for horizontal events, how the difference method of the present invention identifies faults and stratigraphic boundaries. FIG. 2 is a posting of the difference values against horizontal distance in a graph format (FIG. 2 corresponds to FIG. 1). As will be apparent to one of ordinary skill in the art, posting, displaying, plotting, graphing, etc. are equivalent expressions representing a variety of methods of viewing results of calculations, as such the terms posting, displaying and plotting used throughout the description and appended claims are equivalent expressions representing any of the variety of methods of viewing results of the calculations. FIG. 1 has a plurality of traces spaced apart at a predetermined distance corresponding to the spacing on the earth's surface. At time or depth ($t_n$) there is a change in the rock properties which creates events in each of the traces. Because the seismic events are flat (i.e., horizontal), there is no trace to trace difference between the traces (or at most minimal difference) until the fault 2 (offset downward) in the events is encountered. At the fault, the calculated trace to trace difference value between the traces is high, thus the resulting difference profile (FIG. 2) gives a direct indication of the location of the fault. When moving from left to right across the graph, after the fault is passed, there again is no trace to trace difference between subsequent traces.

As mentioned previously, the difference method has direct application to so called 'four-dimensional seismic' by comparing traces acquired at the same location but from different vintages of data for differences. High values of difference correspond to changes in the acoustic properties of the subsurface over the time interval between the two vintages of seismic data. These changes in acoustic properties can be related to changes in fluid properties of the hydrocarbon reservoirs and/or changes in fluid quantities caused by production. Areas in which there has been little change (i.e., there is little difference in the values on the traces being compared) represent areas of unswept and unproduced hydrocarbons.

Conventionally, trace differences are sometimes calculated during conventional processing of seismic data. Under these circumstances, samples at the same location in the data volume that have been subjected to different processing, scaling or filtering parameters are subtracted in order to quantify the effects of the different processing flow, scaling, or filtering. These steps are undertaken as part of the processing flow and are not intended and do not provide information for interpretation. Whereas, in the present invention, trace to trace subtractions are performed for either traces spaced from each other, or traces at the same location but from different vintages of data, to generate a difference attribute (e.g., a series of edge detection attributes) that are extremely powerful for the interpretation and analysis of all forms of seismic data. This previously unrecognized attribute(s) improves the speed and quality of the interpretation process and is generated without interpretational bias from the geoscientist. The difference calculation in this embodiment is useful for both four-dimensional seismic work and for edge detection of faults and stratigraphic boundaries.

Two-Dimensional Difference Attribute and Apparent Dip Calculations

A further embodiment of the present invention is to calculate the difference between traces in the seismic data along the direction of dip of the seismic events. This embodiment is useful for many purposes and particularly for edge detection because edge detection is strongly influenced by increasing dip of the seismic events. In order to accomplish this calculation, the direction of dip of the events has to be identified. The criteria for identifying the direction of dip of the seismic events is that the dip direction corresponds to the direction of minimum difference between values on two or more seismic traces. In other words, connecting the values that have minimal difference between them identifies the dip direction. For example, in FIG. 1 as mentioned there is no or minimal difference from trace to trace at any depth level until fault 2 is reached, thus the seismic event is detected to be horizontal (i.e., the dip direction is flat).

FIG. 3 illustrates a series of seismic traces that record a dipping event having a dip steered direction 7. FIG. 4 corresponds to FIG. 3. If a simple horizontal (i.e., at a constant time or depth) difference calculation is performed on the traces in FIG. 3, then the result is the non-dip steered difference values or curve 6 shown in FIG. 4. This type of difference calculation, when performed on dipping events, results in a range of difference values between the traces that may hide or diminish the difference observed at the true break 4 (e.g., fault, stratigraphic boundary, etc.). This is illustrated in FIG. 4. A simple horizontal difference calculation between each of the traces (which is a constant $t_n$ depth and thus not dip steered) results in curve 6 which has a lower peak difference value than does curve 8 which is the difference values calculated along the dip direction. In addition, curve 6 has other areas of increased difference associated with cutting across the seismic event. As noted above, the direction of dip is defined as the direction of minimum difference, which can be considered, for example, as the direction obtained from connecting all of the amplitude peaks together or amplitude troughs, etc. By calculating the difference along the direction of dip, the maximum resolution of the fault can be obtained as identified by peak 10.

For any two traces (whether adjacent or not), the direction of apparent dip (i.e., the vector of dip intersecting the vertical plane containing the two traces) can be calculated by finding the minimum difference values between the two traces. FIG. 5 represents diagrammatically such an embodiment. Trace $T_2$ has corresponding amplitude values 17 and trace $T_1$ has corresponding amplitude values 19. The migrated or stacked reflection data is read into a conventional computer system. A single sample 16 (i.e., the target sample at $t_n$) on the first trace (i.e., target trace $T_1$) is compared to a range of samples 18 (i.e., the operator length) on the second trace (i.e., operator trace $T_2$) using equation (1) resulting in calculated difference values 21, of which difference value 22 is the minimum difference value. The operator length 18 is centered on the target sample 16 as the apparent dip can be both above or below sample $t_n$ on the operator trace. The size of the operator length 18 is influenced by the largest amount of event dip predicted for the area and the distance $\Delta x$ between the target trace and operator trace. With increasing event dip for a constant trace spacing, the operator length should be increased. With increasing trace spacing for a constant event dip, the operator length should be increased. A difference value is obtained for each sample in the operator length on the second trace using equation (1) to find the difference between each value 17 on trace $T_2$ and the sample 16 on trace $T_1$. The direction of apparent dip $\mu_{at}$ is identified by connecting the target sample 16 on the first trace $T_1$ with the sample 20 on the second trace $T_2$. Sample 20 is the closest sample, out of the samples in the operator length 18, in value to sample 16 and corresponds to the minimum difference value 22 assigned to the target trace $T_1$ for depth $t_n$. Minimum difference value 22 is found by subtracting the single sample 16 on the first trace $T_1$ from each of the samples on the second trace $T_2$. This procedure is repeated for other samples along target trace $T_1$ at different times (or depths) $t_n$, then repeated for some or all of the remaining traces in the data designating each trace in turn as the target trace. A preferred embodiment of the invention is to interpolate the results obtained from the difference calculations, which enables minimum values to be obtained between sample points. This preferred embodiment results in higher resolution results than if the apparent dip calculation is restricted to only the sampled data. In addition to identifying the apparent dip direction, the apparent dip magnitude can be calculated using the following equation.

The apparent dip magnitude is defined as:

$$\mu_{at} = \tan^{-1}(\Delta t / \Delta x) \quad (2)$$

where $\mu_{at}$ is the apparent time dip magnitude, $\Delta t$ is the difference in time between the sample 16 on the first trace $T_1$ and the minimum difference sample 20 on the second trace $T_2$, and $\Delta x$ is the separation between the two traces as seen in FIG. 5. The results from applying equations (1) and (2) in this embodiment yield two edge detection attributes: difference (which is the value of the minimum difference value 22) and apparent dip (which is the apparent dip magnitude $\mu_{at}$). Both of these parameters can be used as display and analysis attributes for two-dimensional seismic data for the use of detecting faults, stratigraphic boundaries, and lithology and/or rock property changes. The difference attribute will have high values of difference (i.e., a high minimum difference) when discontinuities are present within the data. These values can be displayed and/or plotted for use by a geoscientist when analyzing the data by mapping the floating point data to byte data with a range of zero to +127. In this scheme, the low difference values (i.e., values of zero) are mapped to white and high difference values (i.e., values of +127 are mapped to black. The grey scale between white and black corresponds to the difference values between zero and +127. This is only one example of the display and/or plot of difference values. As will be appreciated, the difference values can be displayed in color, or using a variety of scales. In addition, the floating point difference values could be displayed without mapping to byte data. The apparent dip magnitude has an angle ($\mu_{at}$) and a sign ($\pm$). The convention used for the sign of the apparent dip magnitude is positive angles are defined as dipping in the direction of increasing trace numbers in the x direction and negative angles are defined as dipping in the direction of decreasing trace numbers along the x direction. For example, in FIG. 5 $\mu_{at}$ is positive because it is dipping toward trace $T_2$ which is increasing in number from trace $T_1$. The apparent dip magnitude will also highlight boundaries that are associated with changes in dip rate or direction, for example fold axes, faults and unconformities. Crests of anticlines and the troughs of synclines will be highlighted as changes from positive to negative dips, or vice versa. Faults and unconformities will be highlighted as rapid changes in dip (i.e., sudden steep dips) that do not conform to the surrounding dips. In addition, the apparent morphology of anticlines and synclines will be highlighted. For example, the steepness of the limb of a fold will be illustrated by the steepness of the apparent dip magnitude and the openness of the fold will be shown by how quickly dips change.

Three-dimensional Difference, Dip Magnitude and Dip Azimuth Calculations

The difference technique of the present invention is also applicable to three-dimensional data to enable three-dimensional edge detection attributes to be calculated for identifying edges. This embodiment results in the generation of three-dimensional volumes of difference, dip magnitude and/or dip azimuth. In one embodiment, the present invention is a method of processing some or all of the traces in a three-dimensional seismic data volume to identify minimum differences between traces (preferably, adjacent traces although the traces do not have to be adjacent). Processing along at least two directions in the data volume enables the dip magnitude and dip azimuth to be calculated. Although for clarity of the present discussion, the two directions are orthogonal, in a further embodiment the directions can be in any orientation. Accordingly, even though the directions are referred to as x and y in the description and the appending claims, the designations of x and y are not to be construed as being limited to orthogonal x and y orientations (as such any labels such as c and d or 5 and 6, etc. could have been used), but rather these designations encompass all orientations. In addition, a value for the minimum difference can be generated, as will now be described.

FIG. 6 is an isometric view of a portion of a hypothetical three-dimensional seismic data volume. The vertical lines $T_1$, $T_2$, $T_3$, $T_4$ represent seismic traces which are measured in time (or depth) along the z-axis of the data volume. In one embodiment, the present invention is a method of processing some or all of the traces in a three-dimensional seismic data volume to identify minimum differences between traces (preferably although not necessarily, adjacent traces). A plane 26 is then fitted through the minimum difference values (in this example, the value at $t_n$ is the minimum difference value in the x direction and the value at $t_{n-1}$ is the minimum difference value in the y direction) in each of the processed traces (in this example, $T_2$ and $T_3$).

The plane 26 represents the dip direction and magnitude of a seismic event. This embodiment will now be described in more detail.

In one embodiment, the migrated or stacked reflection data is read into a conventional computer system and one of the traces is designated the target trace for example $T_1$ (FIG. 6). The target trace $T_1$ is compared to each of the adjacent traces $T_2$ and $T_3$ one at a time in both the x and y directions. A sample point 12 (i.e., target sample) is defined on the target trace $T_1$. The target sample point 12 represents a time $t_n$ (or depth) along the z-axis of the seismic data. The comparison portion on each of the adjacent traces is referred to as the operator length as discussed above with respect to FIG. 5. The operator length is, for example, 16 milliseconds (i.e., five samples) in length and is centered about the same target sample point time (or depth) as the target sample point 12. The operator length is distributed centered about the same time (or depth) because the minimum difference can be either above or below the sample 12 on the target trace $T_1$ depending on the direction and magnitude of dip.

A difference trace is produced with equation (1) were the target sample is subtracted from the five samples $t_{n-2}$, $t_{n-1}$, $t_n$, $t_{n+1}$, $t_{n+2}$ of the first adjacent trace $T_2$ in the x direction as shown in FIGS. 5 and 6 such that:

$$D(\Delta t_m) = T_2(t_i + \Delta t_m) - T_1(t_i) \qquad (3)$$

where $D(\Delta t_m)$ is the resulting difference trace, $T_1$ is the target trace, $T_2$ is the first adjacent trace, $t_i$ is the initial time (or depth) sample and $\Delta t_m$ is a range of samples defined in the operator length (e.g., $t_{n-2}$ through $t_{n+2}$). After generating the first difference trace, the same procedure is repeated for the trace orthogonal to $T_2$ in the grid (i.e., $T_3$) to produce a second difference trace. As will be recognized, the above procedure can be done in differing order such as in the y direction first then the x direction. Two apparent dip magnitudes are identified from the two orthogonal directions by calculating the angle from the sample point 12 to the sample on the adjacent trace having the nearest value to sample 12 (i.e., the smallest difference) for the x direction then the y direction as in equation (2). The dip magnitude and dip azimuth are defined as:

$$\mu_t = \cos^{-1}[1/sqrt\{1 + (\Delta t_x/\Delta x)^2 + (\Delta t_y/\Delta y)^2\}] \qquad (4)$$

$$\theta = \alpha + \tan^{-1}\{(\Delta t_x * \Delta y)/(\Delta t_y * \Delta x)\} \qquad (5)$$

where $\mu_t$ is the time dip magnitude, $\Delta t_x$ is the time difference between the target sample and the minimum value on $T_2$ (i.e., the x direction), $\Delta t_y$ is the time difference between the target sample and the minimum value on $T_3$ (i.e., the y direction), $\Delta x$ is the distance between the traces in the x direction, $\Delta y$ is the distance between the traces in the y direction, $\theta$ is the dip azimuth and $\alpha$ is the angle between the x direction and true north.

The difference value for sample 12 can be assigned in a number of ways. The preferred embodiment is to take the average of the two difference values px and py (i.e., in the x and y directions). Therefore, the difference is defined as follows:

$$D(p) = (px + py)/2 \qquad (6)$$

where $D(p)$ is the difference value, px is the minimum difference in the x direction and py is the minimum difference in the y direction. However as will be appreciated by one of ordinary skill in the art, the difference value could be calculated according to a range of other statistical procedures, for example, selecting the maximum of the two values (i.e., either px or py), selecting the minimum of the two values (i.e., either px or py), selecting the range of the two values (i.e., px-py), etc.

The same procedure is then repeated for a new target trace until all of the traces in the seismic data volume have been processed resulting in average (or minimum, maximum, range, or whatever method is used) minimum difference, dip magnitude and dip azimuth values for every trace. The average minimum difference values are then plotted to generate a difference cube as shown in FIG. 7. In FIG. 7, the average minimum difference values have been mapped such that low difference values, for example, 0 to 30 are white and 30 to 95 are shades of grey and 95 to 127 are black. The high difference values (black) in FIG. 7 highlight a series of steeply dipping planar faults. In such an embodiment, the difference values are dip steered in three dimensions and, therefore, eliminate the effects of increasing dip that were mentioned in the non-dip steered case (i.e., the possibility that some values might hide or diminish a fault or edge). The resulting attributes can be used for three-dimensional edge detection with the advantage that the three attributes of difference, dip magnitude and dip azimuth can be used individually, or together, to enhance the interpreters understanding of the variations in structural form, fault distributions, stratigraphic boundaries, lithology prediction, pore fluid changes, and four-dimensional seismic work. FIG. 8 is a map view of a time slice cut-through the difference volume of FIG. 7. FIG. 8 illustrates how the difference attribute readily shows faults 2, edges, etc.

Multi-trace Samples for Difference, Dip Magnitude and Dip Azimuth Calculations

Another embodiment of the invention is to calculate the minimum difference in both the x and y direction using a plurality of traces. A typical trace spacing is 1 to 50 traces, more typically 10 to 30 traces, but is equally applicable to 1 to any number of traces. The rationale for increasing the number of traces to be included in the calculation of the difference values is firstly, noise reduction (i.e., removing the effects of random noise), and secondly, the ability to calculate a lower frequency 'regional' dip, which represents the dip of the seismic events and not the anomalous boundaries that the method is trying to detect. The number of traces that are used is dependent on the rate of change of dip in the area under consideration. For example, if the rate of change of dip is great then a relatively small number of traces can be used, for example 1 to 5 traces, if the rate of dip is small then a relatively large number of traces can be used, for example 10 to 20 traces. These are only illustrative, many different ranges can be used depending on the resolution desired. A typical distance covered by the trace spacing is 50 m to 1000 m, but is equally applicable to a spacing of 0 m to any number of meters.

For example, in FIG. 9 the comparison is performed in a 3 by 3 array of traces $T_1$ through $T_9$ with the target trace being $T_1$ at the center of the array. The calculations are performed in the same way as described with respect to equations (4) and (5). The apparent dip in the x and y directions are defined as absolute minimum product of the difference traces in each direction such that:

$$\Delta t_x = |(D(\Delta t_m)_{T2} * D(\Delta t_m)_{T5})|_{min} \qquad (7)$$

$$\Delta t_y = |(D(\Delta t_m)_{T3} * D(\Delta t_m)_{T6})|_{min} \qquad (8)$$

where $\Delta t_x$ is the difference in time between sample $t_n$ on trace 1 and the minimum difference on traces 2 and 5, $D(\Delta t_m)_{T2}$ is the difference trace for trace 2, $D(\Delta t_m)_{T5}$ is the difference trace for trace 5, $\Delta t_m$ is the range of samples defined in the operator length 39, $\Delta t_y$ is the difference in time between sample $t_n$ on trace 1 and the minimum difference on traces 3 and 6, $D(\Delta t_m)_{T3}$ is the difference trace for trace 3, and $D(\Delta t_m)_{T6}$ is the difference trace for trace 6. Equations (4) and (5) can be used to calculate the true time (or depth) dip magnitude and dip azimuth for the traces. In the preferred embodiment, the difference value assigned to sample $t_n$ on trace 1 is the weighted average of the difference values that define the dipping plane such that px and py are defined as the minimum weighted average of the two difference traces (e.g., $T_2$ and $T_5$ in the x direction and $T_3$ and $T_6$ in the y direction).

The weighted average is calculated as a distance weighted average. The distance weighing enables multiple traces to be included to calculate the minimum difference in both the x and y directions, while applying the correct weight to allow for changes away from the target trace $T_1$. Distance weighing is a conventional mathematical procedure for this type of calculation. The distance weighted average need not be the value that is assigned to sample $t_n$ on trace 1. As mentioned above, the difference value could be calculated according to a range of other statistical procedures such as the maximum or minimum difference value of the difference values that define the dipping plane, the range of the differences values that define the dipping plane, the standard deviation of the difference values that define the dipping plane, etc. as is apparent to one of ordinary skill in the art.

The dip steering calculation and difference calculations need not be performed over the same number of traces. For example, the dip magnitude and azimuth calculation could be performed over a window of 10 by 10 traces.

Once the dipping plane has been defined a smaller window, such as 3 by 3, traces can be used to calculate the difference value for the defined dip direction and azimuth. In addition, the calculation of the dip magnitude, dip azimuth and difference is not restricted to using orthogonal traces in the x and y direction. In FIG. 9, traces $T_4$, $T_7$, $T_8$ and $T_9$ could also be included in the calculation.

In the preferred embodiment, as the distance between the target trace and the operator trace increases, the operator length is increased. For example, if a 5 by 5 array of traces were used in the calculation, the traces adjacent to the target trace would have a smaller operator length than the traces that are two traces away from the target trace. The change in the size of the operator length is governed by the maximum event dip being looked for. The maximum event dip, measured as an angle or in time per distance, dictates the size of the operator length at various offsets from the target trace.

Using Target Windows for Difference, Dip Magnitude and Dip Azimuth Calculations

An additional preferred embodiment of the invention is to define a target window on the target trace for comparison with the operator length. A target window 28 (as opposed to just using the target sample as discussed above) is defined around the initial target sample point 30 (e.g., a target window 28 may be defined as 16 milliseconds in length, which typically has five samples in that 16 milliseconds) (FIG. 10). The target window 28 of the target trace $T_1$ is compared to the operator length 32 (e.g., fourteen samples) defined on each of the adjacent traces to generate a difference trace at each location (for example $T_2$ in FIG. 10). The difference trace is generated by subtracting the five samples of the target window 28 from the first five samples of the operator length 32. The resulting five differences are summed and posted as operator sample 34 (FIG. 10). Then the five samples of the target window 28 are subtracted from the second, third, fourth, fifth, and sixth samples of the operator length 32. The resulting five differences are summed and posted as operator sample 36. Then the five samples of the target window 28 are subtracted from the third, fourth, fifth, sixth, and seventh samples of the operator length 32. The resulting five differences are combined and posted as operator sample 37. The resulting five differences can be combined in any of a number of methods, for example but not limited to, addition, multiplication, square root of the summed squared values, etc. This process is repeated for all of the samples in the operator length 32. Operator samples can also be referred to as difference values or samples. A target window of five samples and an operator length of 14 samples will result in a difference trace $D(\Delta t_m)$ of ten samples because of two redundant samples at each end which result in nulls. The sizes of the target and operator windows and resulting difference trace are described here purely as an example. These parameters can be varied over a wide range of scales. For the example just described, the difference trace $D(\Delta t_m)$ generated in the above steps consists of 10 values. The ten values are then searched for a minimum value (px), 34. The angle of apparent dip for this direction (i.e., x or y) is the angle with respect to horizontal between the initial target sample point 30 in the target trace and the minimum value on the difference trace. The minimum value is also the difference value px for the target sample point 30.

After the calculation of the first difference value, the target window on the target trace and the operator length on the other trace are shifted down one sample and the process described above is repeated resulting in the generation of the minimum difference (px) value for the second target sample. This process is repeated for all of the samples in the target trace resulting in the generation of a minimum difference (px) from trace to trace. The above procedure is repeated to find the angle of apparent dip in the y direction and to determine py. Then the same procedure as discussed with respect to equations (4), (5) and (6) are used to find the dip magnitude, dip azimuth and difference. The same is repeated for a new target trace until all of the traces in the seismic data volume have been processed. The difference, dip magnitude and/or dip azimuth are then displayed/plotted.

The five sample target window and fourteen sample operator length were used only for discussion purposes. Target windows and operator lengths of any number of samples can be used. The use of a target window to generate the initial difference traces provides a more robust calculation that generates results that have a much higher signal to noise ratio. Target windows can range in size and are user defined depending on the quality of the input data and the type of data being processed. For example, if the input data is noisy, then preferably a relatively large sized target window is used. In one embodiment using amplitude data of generally good quality a target window of 21 values was used. With respect to the type of data used, in one embodiment using instantaneous phase a target window of 1 value was used. Target windows can be used in conjunction with multi-trace samples to calculate the dip magnitude and azimuth as in equations (7) and (8).

Trace Normalization for Difference, Dip Magnitude and Dip Azimuth Calculations

An additional embodiment of the invention is to normalize the calculated difference values. The normalization of the difference values reduces the possibility of anomalous values causing a significant change in the resultant minimum difference direction. This process, therefore, improves the signal to noise ratio for the data. Trace normalization can be done on a trace to trace basis or with respect to the total energy contained within the volume being used for the calculation. On a trace to trace basis, the calculation of the normalized trace difference is:

$$D(t)=[T_2(t)-T_1(t)]/[T_2(t)^2+T_1(t)^2] \quad (9)$$

where D(t) is the resulting difference trace, $T_1$ is the target trace, $T_2$ is the first adjacent trace, t is the time (or depth). The denominator function in equation (9) is the function that uses the total energy of the traces to normalize the resulting difference. This function can be expanded to include the total energy of all of the traces to be included in the calculation (i.e., the surrounding volume) by adding the square of each the surrounding traces to the denominator.

On a trace to trace basis with a target window of 1 to n traces and an operator length of $\Delta t_m$, the calculation of the normalized trace difference is:

$$D(\Delta t_m)=\Sigma_{i=1}^{n}[T_2(t_i+\Delta t_m)-T_1(t_i)]^2/\{\Sigma_{i=1}^{n}[T_2(t_i=\Delta t_m)]^2=\Sigma_{i=1}^{n}[T_1(t_i)]^2\} \quad (10)$$

where $D(\Delta t_m)$ is the resulting difference trace, $T_1$ is the target trace, $T_2$ is the first adjacent trace, $t_i$ is the initial time (or depth) sample, n is the number of samples in the target window and $\Delta t_m$ is a range of samples defined in the operator length. The denominator function in equation (10) is the function that uses the total energy of the traces to normalize the resulting difference. This function can be expanded to include the total energy of all of the traces to be included in the calculation (i.e., the surrounding volume) by adding the summed square of each of the surrounding traces to the denominator.

Plane Fitting for Difference, Dip Magnitude and Dip Azimuth Calculations

An additional embodiment of the invention is to calculate a difference trace for all of the traces surrounding the target trace and to fit a plane through the resulting difference values using the criteria of a plane with minimum difference and, in one embodiment, using a least squares fitting algorithm. The resulting plane represents the dip azimuth and dip magnitude of a seismic event. The minimum difference value is calculated as the sum of the difference values on each trace where they intersect the plane. The surrounding difference traces can but need not be orthogonal to each other and they can but need not be at a constant distance from the target trace.

For example in FIG. 11, eight difference traces $T_2$ through $T_9$ surrounding the target trace $T_1$ are generated for the 3 by 3 array as discussed above. These differences are searched for a plane (i.e., non-curved surface) that defines the minimum difference (i.e., the smallest difference values) of the eight difference traces. In some situations, a plane cannot be defined that fits through all minimum values, in those cases, the criteria for defining the plane is that the sum of differences is the minimum of all the possible planes. The values on each of the difference traces that intersect the plane are then averaged and posted as the minimum difference value for the first target sample 14 on the target trace $T_1$. Although, alternative statistical results can be displayed as would be familiar to one of ordinary skill in the art. The process of generating difference traces and fitting a plane that defines the minimum difference is then repeated for all of the values on the target trace and then for all of the traces in the dataset. This method again yields edge detection attributes of dip magnitude, dip azimuth and difference for a part of or a whole three-dimensional data volume. The plane fitting analysis can be combined with the multi-trace, target window, and trace normalization embodiments.

The methods of the present invention result in a new attribute (designated the difference attribute) for plotting and display in volumes and map views. The difference attribute can be generated from any attribute of the seismic data (e.g., amplitude (as discussed previously), instantaneous phase, instantaneous frequency, etc.) resulting in amplitude difference volumes, instantaneous phase difference volumes, instantaneous frequency difference volumes, etc. The difference attribute can be calculated for both two-dimensional and three-dimensional seismic data for generating profiles or volumes of the attribute. The difference attribute enables edge detection to be performed early in the interpretation work process without interpretational bias.

In addition to the difference attribute, the present invention also results in the generation of dip magnitude and dip azimuth attributes, which can also be used for edge detection. These attributes also have application to the technique of autopicking seismic data. Knowing the dip magnitude and dip azimuth at some or all locations in the three-dimensional volume provides a steering mechanism for autopicking routines. The autopicking of horizons can, therefore, be constrained not only by a characteristic amplitude but also by a direction and magnitude of dip for the event.

True Dip Magnitude Calculations

The calculation of dip magnitude in equations (2) and (4) is described assuming that the seismic data is x, y, and time data. Thus, equation (2) results in the calculation of apparent time dip and equation (4) results in the calculation of true time dip. If the seismic data has been depth converted the application of equations (2) and (4) will result in the calculation of apparent and true dip magnitude respectively. Alternatively, a velocity function can be introduced into equations (2) and (4) such that:

$$\mu_a=\tan^{-1}\{(\Delta t^* V_t)/\Delta x\} \quad (11)$$

$$\mu=\cos^{-1}[1/(sqrt\{1+(\Delta t_x/\Delta x)^2+(\Delta t_y/\Delta y)^2\}^* v_t)] \quad (12)$$

where $\mu_a$ is the apparent dip, $\mu$ is the true dip and $V_t$ is the velocity at the time under consideration. The resulting true dip magnitude data can be incorporated into the interpretation process and allows direct comparison with surface or wireline log derived formation dip data.

The methods of the invention according to the above-described preferred embodiments were applied using a computer program written in C computer language on a conventional computer system such as shown in FIG. 12 comprising a central processing unit 42, display 44, input device 46, and plotter 48. A preferred system comprises an "Indigo II extreme" computer and corresponding 17" monitor, based on the 32 bit MIPS RISC R4400 microprocessor from Silicon Graphics Inc. in Mountain View, Calif. The system has 1 R4400, 250 mhz chip with 256 megabytes of RAM and 12 gigabytes of disk storage capacity. Input data 47 for the system includes, but is not limited to, a digital computer file with gridded amplitude seismic data. Various plotters can be used to produce the volumes and map views, for example, a "DesignJet 755CM", model no. C3198A from the Hewlett-Packard Co. in Palo Alto, Calif. It should be appreciated that the results of the methods of the invention can be displayed, plotted, or both.

There is a significant time savings in the two-dimensional and three-dimensional seismic interpretation processes when using the methods described in this application for many reasons including, but not limited to: edge detection can be performed early in the interpretation process; edge detection attributes are generated without interpretational bias; fault correlation and structural framework analysis are performed early in the interpretation process; fewer number of time slices are required to describe a structure than associated inlines and crosslines; downplunge projections improve structural understanding; and event terminations (e.g., onlap, downlap etc.) are more readily apparent for sequence stratigraphy.

While the invention has been described with reference to the foregoing embodiments, changes and variations may be made thereto which fall within the scope of the appended claims. Further changes and variations may be made thereto which are within the scope of the appended claims. All such modifications and/or changes are intended to be included within the scope of the claims.

What is claimed is:

1. A method of processing data of seismic traces for geophysical interpretation of the earth's subsurface, comprising the steps of:

subtracting a first sample on a first trace from a first sample of a first operator length on a second trace to produce a first difference value, the first operator length being centered about a first operator length sample corresponding to the first sample of the first trace;

subtracting the first sample from a second sample of the first operator length to produce a second difference value;

designating the minimum of the first difference value and the second difference value as a first minimum difference value for the first difference trace; and posting the first minimum difference value as the first sample in the first difference trace to identify changes within the earth's subsurface.

2. The method of claim 1, further comprising:

subtracting a second sample on the first trace from the first sample of the first operator length on the second trace to produce a first difference value, the first operator length being centered about a first operator length sample corresponding to the second sample of the first trace;

subtracting the second sample on the first trace from the second sample of the first operator length to produce a second difference value;

designating the minimum of the first difference value and the second difference value as a second minimum difference value for the first difference trace; and posting the second minimum difference value as the second sample in the first difference trace.

3. The method of claim 1, wherein the first subtracting step comprises subtracting a first sample on a first trace from a first sample of a first operator length on an adjacent second trace to produce a first difference value, the first operator length being centered about a first operator length sample corresponding to the first sample of the first trace.

4. The method of claim 1 further comprising:

subtracting the first sample on the first trace from a first sample of a first operator length on a third trace to produce a third difference value, the first operator length being centered about a first operator length sample corresponding to the first sample of the first trace;

subtracting the first sample from a second sample of the first operator length to produce a fourth difference value;

designating the minimum of the third difference value and the fourth difference value as a first minimum difference value for the second difference trace; and producing a selected difference value from the first minimum difference value of the first difference trace and the first minimum difference value of the second difference trace; and wherein the posting step comprises: posting the selected difference value to identify changes within the earth's subsurface.

5. The method of claim 4 wherein the producing step comprises:

producing the selected difference value by calculating the average of the first minimum difference value of the first difference trace and the first minimum difference value of the second difference trace.

6. The method of claim 4 wherein the producing step comprises:

producing the selected difference value by selecting the maximum value of the first minimum difference value of the first difference trace and the first minimum difference value of the second difference trace.

7. The method of claim 4 wherein the producing step comprises:

producing the selected difference value by selecting the minimum value of the first minimum difference value of the first difference trace and the first minimum difference value of the second difference trace.

8. The method of claim 4 wherein the producing step comprises:

producing the selected difference value by subtracting the first minimum difference value of the first difference trace from the first minimum difference value of the second difference trace.

9. The method of claim 4, further comprising:

determining the time dip magnitude ($\mu_t$) for the first sample on the first trace by:

$$\Delta_t = \cos^{-1}[1/sqrt\{1+(\Delta t_x/\Delta x)^2+(\Delta t_y/\Delta y)^2\}]$$

wherein $\Delta t_x$ is the difference in time between the first sample on the first trace and the sample on the second trace corresponding to the first minimum difference value of the first difference trace, $\Delta t_y$ is the difference in time between the first sample on the first trace and the sample on the third trace corresponding to the first minimum difference value of the second difference trace, $\Delta x$ is the distance between the first trace and the second trace, and $\Delta y$ is the distance between the first trace and the third trace.

10. The method of claim 1 further comprising:

subtracting the first sample on the first trace from a first sample of a first operator length on a third trace to produce a third difference value, the first operator length being centered about a first operator length sample corresponding to the first sample of the first trace;

subtracting the first sample from a second sample of the first operator length to produce a fourth difference value;

designating the minimum of the third difference value and the fourth difference value as a first minimum difference value for the second difference trace;

subtracting the first sample on the first trace from a first sample of a first operator length on a fourth trace to produce a fifth difference value, the first operator length being centered about a first operator length sample corresponding to the first sample of the first trace;

subtracting the first sample on the first trace from a second sample of the first operator length to produce a sixth difference value;

designating the minimum of the fifth difference value and the sixth difference value as a first minimum difference value for the third difference trace; and producing a selected difference value from the first minimum difference value of the first difference trace, the first minimum difference value of the second difference trace and the first minimum difference value of the third difference trace; and wherein the posting step comprises:

posting the selected difference value to identify changes within the earth's subsurface.

11. The method of claim 10 wherein the producing step comprises:

producing the selected difference value by calculating the average of the first minimum difference value of the first difference trace, the first minimum difference value of the second difference trace and the first minimum difference value of the third difference trace.

12. The method of claim 10 wherein the producing step comprises:

producing the selected difference value by selecting the maximum value of the first minimum difference value of the first difference trace, the first minimum difference value of the second difference trace and the first minimum difference value of the third difference trace.

13. The method of claim 10 wherein the producing step comprises:

producing the selected difference value by selecting the minimum value of the first minimum difference value of the first difference trace, the first minimum difference value of the second difference trace and the first minimum difference value of the third difference trace.

14. The method of claim 10 wherein the producing step comprises:

producing the selected difference value by subtracting a minimum first minimum difference value from a maximum first minimum difference value of the first difference trace, the second difference trace and the third difference trace.

15. The method of claim 10 further comprising:

defining a plane by searching the first sample on the first trace and the samples that correspond to the first minimum difference value on the first difference trace, the second difference trace and the third difference trace which a maximum dip of the plane represents the dip magnitude;

posting the dip magnitude of the defined plane to identify changes in the earth's subsurface.

16. The method of claim 10 further comprising:

defining a plane by searching the first sample on the first trace and the samples that correspond to the first minimum difference value on the first difference trace, the second difference trace and the third difference trace which a direction of maximum dip of the plane represents the dip azimuth;

posting the dip azimuth of the defined plane to identify changes in the earth's subsurface.

17. A method of processing data of seismic traces for geophysical interpretation of the earth's subsurface, comprising the steps of:

subtracting a first window on a first trace centered about a first sample from a first portion of a first operator length on a second trace and combining the resulting values to produce a first difference value, the first operator length being centered about a first operator length sample corresponding to the first sample of the first window;

subtracting the first window from a second portion of the first operator length and combining the resulting values to produce a second difference value;

designating the minimum of the first difference value and the second difference value as a first minimum difference value for the first difference trace;

subtracting the first window on the first trace from a first portion of a first operator length on a third trace and combining the resulting values to produce a third difference value, the first operator length on the being centered about a first operator length sample corresponding to the first sample of the first window, the third trace is in a first plane containing the first trace, the first plane being orthogonal to a second plane containing the first trace and the second trace;

subtracting the first window from a second portion of the first operator length of the third trace and combining the resulting values to produce a fourth difference value;

designating the minimum of the third difference value and the fourth difference value as a first minimum difference value for a second difference trace;

producing a selected difference value from the first minimum difference value of the first difference trace and the first minimum difference value of the second difference trace; and posting the selected difference value to identify changes within the earth's subsurface.

18. The method of claim 17, wherein the producing step comprises:

producing the selected difference value by calculating the average of the first minimum difference value of the first difference trace and the first minimum difference value of the second difference trace by:

$$D(p) = (px + py)/2$$

wherein $D(p)$ is the selected difference value, $px$ is the first minimum difference value on the first difference trace and $py$ is the first minimum difference value on the second difference trace.

19. The method of claim 17 wherein the producing step comprises:

producing the selected difference value by selecting the maximum value of the first minimum difference value on the first difference trace and the first minimum difference value on the second difference trace.

20. The method of claim 17, further comprising:

subtracting the first window on the first trace centered about a second sample from the first portion of the first operator length on the second trace, the first operator length being centered about a second operator length sample corresponding to the second sample of the first window and combining the resulting values to produce a fifth difference value;

subtracting the first window from the second portion of the first operator length and combining the resulting values to produce a sixth difference value;

designating the minimum of the fifth difference value and the sixth difference value as a second minimum difference value for the first difference trace;

subtracting the first window on the first trace centered about a second sample from the first portion of the first operator length on the third trace, the first operator length being centered about a second operator length sample corresponding to the second sample of the first window and combining the resulting values to produce a seventh difference value;

subtracting the first window from the second portion of the first operator length and combining the resulting values to produce an eighth difference value;

designating the minimum of the seventh difference value and the eighth difference value as a second minimum difference value for the second difference trace;

producing a selected difference value from the second minimum difference value of the first difference trace and the second minimum difference value of the second difference trace; and posting the selected difference value to identify changes within the earth's subsurface.

21. The method of claim 17, wherein the first subtracting step comprises:

subtracting a first window on the first trace from a first portion of a first operator length on an adjacent second trace to produce a first difference value, the first operator length being centered about a first operator length sample corresponding to the first sample of the first trace; and the third subtracting step comprises subtracting the first window on the first trace from a first portion of a first operator length on an adjacent third trace to produce a third difference value, the first operator length being centered about a first operator length sample corresponding to the first sample of the first trace.

22. The method of claim 17 wherein the subtracting and designating steps comprise the following steps:

determining the first minimum difference value of the first difference trace by:

$$D(\Delta t_{mx}) = \Sigma_{i=1}^{n}[T_2(t_i+\Delta t_m)-T_1(t_i)]^2 / \{\Sigma_{i=1}^{n}[T_2(t_i+\Delta t_m)]^2 + \Sigma_{i=1}^{n}[T_1(t_i)]^2\}$$

where $D(\Delta t_{mx})$ is the resulting difference values, $T_1$ is the first trace, $T_2$ is the second trace, $t_i$ is the initial time sample, n is the number of samples in the first window and $\Delta t_m$ is a range of samples defined in the first operator length;

designating the minimum $D(\Delta t_{mx})$ value as the first minimum difference value of the first difference trace;

determining the first minimum difference value of the second difference trace by:

$$D(\Delta t_{my}) = \Sigma_{i=1}^{n}[T_3(t_i+\Delta t_m)-T_1(t_i)]^2 / \{\Sigma_{i=1}^{n}[T_3(t_i+\Delta t_m)]^2 + \Sigma_{i=1}^{n}[T_1(t_i)]^2\}$$

where $D(\Delta t_{my})$ is the resulting difference values, $T_1$ is the first trace, $T_3$ is the third trace, $t_i$ is the initial time sample, n is the number of samples in the first window and $\Delta t_m$ is a range of samples defined in the first operator length;

designating the minimum $D(\Delta t_{my})$ value as the first minimum difference value of the second difference trace.

23. The method of claim 4, further comprising:

determining dip azimuth ($\theta$) for the first sample on the first trace by:

$$\theta = \alpha + \tan^{-1}\{(\Delta t_x * \Delta y)/(\Delta t_y * \Delta x)\}$$

wherein $\alpha$ is the angle between true north and the direction from the first trace to the second trace, $\Delta t_x$ is the difference in time between the first sample on the first trace and the sample on the second trace corresponding to the first minimum difference value of the first difference trace, $\Delta t_y$ is the difference in time between the first sample on the first trace and the sample on the third trace corresponding to the first minimum difference value of the second difference trace, $\Delta x$ is the distance between the first trace and the second trace, and $\Delta y$ is the distance between the first trace and the third trace.

* * * * *